US012288537B2

(12) United States Patent
Li

(10) Patent No.: US 12,288,537 B2
(45) Date of Patent: Apr. 29, 2025

(54) DISPLAY DEVICE AND DRIVING METHOD THEREOF CAPABLE OF PREVENTING DISPLAY UNEVENNESS

(71) Applicant: TCL CHINA STAR OPTOELECTRONICS TECHNOLOGY CO., LTD., Guangdong (CN)

(72) Inventor: Wenfang Li, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/600,430

(22) PCT Filed: Jul. 16, 2021

(86) PCT No.: PCT/CN2021/106920

§ 371 (c)(1),
(2) Date: Apr. 17, 2024

(87) PCT Pub. No.: WO2022/267116

PCT Pub. Date: Dec. 29, 2022

(65) Prior Publication Data

US 2024/0257785 A1 Aug. 1, 2024

(30) Foreign Application Priority Data

Jun. 23, 2021 (CN) ......................... 202110696358.2

(51) Int. Cl.
*G09G 5/10* (2006.01)

(52) U.S. Cl.
CPC ....... *G09G 5/10* (2013.01); *G09G 2320/0223* (2013.01); *G09G 2320/0233* (2013.01)

(58) Field of Classification Search
CPC ............. G09G 5/10; G09G 2320/0223; G09G 2320/0233; G09G 3/3688; G02F 1/13452
See application file for complete search history.

(56) References Cited

U.S. PATENT DOCUMENTS

| | | | | |
|---|---|---|---|---|
| 11,417,254 | B2 * | 8/2022 | Kim | G09G 3/035 |
| 2012/0098801 | A1 * | 4/2012 | Mizoguchi | G09G 3/22 345/204 |

(Continued)

FOREIGN PATENT DOCUMENTS

| | | |
|---|---|---|
| CN | 105976783 | 9/2016 |
| CN | 106816142 | 6/2017 |

(Continued)

*Primary Examiner* — Rodney Amadiz

(57) ABSTRACT

A display device and a driving method thereof are provided. Driving current intervals from small to large are input to a plurality of horizontal display areas from being close to a source driver to far away from the source driver to realize a driving ability from small to large for the plurality of horizontal display areas. This solves a problem of gradual decrease in brightness caused by gradually increasing capacitive resistance loads of the plurality of horizontal display areas from being close to the source driver to far away from the source driver, so as to reduce brightness difference between the plurality of horizontal display areas. Therefore, the brightness of each horizontal display area is basically the same, and a display panel is prevented from displaying unevenness.

17 Claims, 5 Drawing Sheets

(56) References Cited

U.S. PATENT DOCUMENTS

| | | | | |
|---|---|---|---|---|
| 2013/0120344 | A1 | 5/2013 | Liao | |
| 2017/0287383 | A1 | 10/2017 | Hasegawa | |
| 2018/0336860 | A1* | 11/2018 | Xing | G09G 3/3688 |
| 2022/0351661 | A1* | 11/2022 | Choi | G09G 3/20 |
| 2022/0415230 | A1* | 12/2022 | Kwon | G09G 3/20 |

FOREIGN PATENT DOCUMENTS

| | | |
|---|---|---|
| CN | 105810174 | 7/2017 |
| CN | 107025892 | 8/2017 |
| CN | 107657926 | 2/2018 |
| CN | 110310605 | 10/2019 |
| CN | 112863456 | 5/2021 |

* cited by examiner

DISPLAY DEVICE AND DRIVING METHOD THEREOF CAPABLE OF PREVENTING DISPLAY UNEVENNESS

RELATED APPLICATIONS

This application is a National Phase of PCT Patent Application No. PCT/CN2021/106920 having International filing date of Jul. 16, 2021, which claims the benefit of priority of Chinese Patent Application No. 202110696358.2 filed on Jun. 23, 2021. The contents of the above applications are all incorporated by reference as if fully set forth herein in their entirety.

FIELD AND BACKGROUND OF THE INVENTION

The present application relates to a field of display technology, and in particular to a display device and a driving method thereof.

Currently, as resolution, size, and refresh rate of display panels increase, this leads to shorter charging times for each pixel unit in the display panel. Furthermore, because capacitive resistance loads (RC loading) of input channels corresponding to a pixel unit close to a source driver to a pixel unit far away from the source driver gradually increases, the charging time from the pixel unit close to the source driver to the pixel unit far away from the source driver becomes shorter. Therefore, brightness of the pixel unit close to the source driver to the pixel unit far away from the source driver is getting lower. For example, FIG. 1 is a schematic structural diagram of a display device in the prior art, and the display panel has four horizontal display areas as shown in FIG. 1: namely, area 1, area 2, area 3, and area 4. The brightness of area 1 to area 4 will be getting lower, resulting in an uneven display of the display panel.

Therefore, the brightness of the horizontal display area close to the source driver to the horizontal display area far away from the source driver is getting lower, which causes the display of the display panel to be uneven. This is a technical problem that needs to be solved for display panels of large size, high resolution, and high refresh rate.

SUMMARY OF THE INVENTION

In order to solve the above technical problems, the embodiments of the present application provide a display device and a driving method thereof to make the display of the display panel uniform.

In a first aspect, an embodiment of the present application provides a display device, which includes a display panel, and at least one source driver connected to the display panel. The display panel includes a plurality of horizontal display areas from being close to the source driver to far away from the source driver. The source driver is configured to respectively output different driving current intervals through a plurality of input channels to correspondingly drive the plurality of horizontal display areas from being close to the source driver to far away from the source driver, and the driving current intervals corresponding to the plurality of horizontal display areas from being close to the source driver to far away from the source driver gradually increase.

In some embodiments, the source driver is further configured to selectively output different driving currents in each driving current interval corresponding to each horizontal display area to respectively drive a middle sub-area to two-side sub-areas of each horizontal display area, and the driving currents corresponding to the middle sub-area to the two-side sub-areas gradually increase In some embodiments, the source driver includes at least one multi-output adjustable current source, the plurality of input channels are respectively connected with the multi-output adjustable current source, and the multi-output adjustable current source is configured to output a corresponding driving current interval to drive one of the plurality of horizontal display areas.

In some embodiments, the multi-output adjustable current source is further configured to output driving currents of different magnitudes in the driving current interval corresponding to each horizontal display area to drive the middle sub-area to the two-side sub-areas of each horizontal display area.

In some embodiments, each input channel is connected to an adjustable compensation resistor in series, wherein compensation resistance intervals selected for the plurality of horizontal display areas from being close to the source driver to far away from the source driver gradually decreases.

In some embodiments, the compensation resistance values of each compensation resistance interval selected for each horizontal display area from the middle sub-area to the two-side sub-areas of each horizontal display area gradually decrease.

In some embodiments, the adjustable compensation resistor is an adjustable resistor.

In some embodiments, the adjustable compensation resistor includes a plurality of parallel branches, each of the plurality of parallel branches includes a resistor and a switch connected in series, and magnitudes of resistance of the plurality of parallel branches are different.

In a second aspect, an embodiment of the present application further provides a display device, including a display panel, and at least one source driver connected to the display panel. The display panel includes a plurality of horizontal display areas from being close to the source driver to far away from the source driver, wherein the source driver is configured to respectively output different driving current intervals through a plurality of input channels to correspondingly drive the plurality of horizontal display areas from being close to the source driver to far away from the source driver, and the driving current intervals corresponding to the plurality of horizontal display areas from being close to the source driver to far away from the source driver gradually increase, and wherein the source driver is further configured to selectively output different driving currents in each driving current interval corresponding to each horizontal display area to respectively drive a middle sub-area to two-side sub-areas of each horizontal display area, and the driving currents corresponding to the middle sub-area to the two-side sub-areas gradually increase.

In some embodiments, the source driver includes at least one multi-output adjustable current source, the plurality of input channels are respectively connected with the multi-output adjustable current source, and the multi-output adjustable current source is configured to output a corresponding driving current interval to drive one of the plurality of horizontal display areas.

In some embodiments, the multi-output adjustable current source is further configured to output driving currents of different magnitudes in the driving current interval corresponding to each horizontal display area to drive the middle sub-area to the two-side sub-area of each horizontal display area.

In some embodiments, each input channel is connected to an adjustable compensation resistor in series, and wherein the compensation resistance intervals selected for the plurality of horizontal display areas from being close to the source driver to far away from the source driver gradually decreases.

In some embodiments, compensation resistance values of each compensation resistance interval selected for each horizontal display area from a middle sub-area to two-side sub-areas of each horizontal display area gradually decreases.

In some embodiments, the adjustable compensation resistor is an adjustable resistor.

In some embodiments, the adjustable compensation resistor includes a plurality of parallel branches, each of the plurality of parallel branches includes a resistor and a switch connected in series, and magnitudes of resistance of the plurality of parallel branches are different.

In a third aspect, an embodiment of the present application provides a driving method of a display device. The display device includes a display panel and at least one source driver connected to the display panel. The display panel includes a plurality of horizontal display areas from being close to the source driver to far away from the source driver. The driving method includes: respectively outputting different driving current intervals through a plurality of input channels by the source driver to correspondingly drive the plurality of horizontal display areas from being close to the source driver to far away from the source driver, and the driving current intervals corresponding to the plurality of horizontal display areas from being close to the source driver to far away from the source driver gradually increase.

In some embodiments, the driving method further includes: selectively outputting different driving currents in each driving current interval corresponding to each horizontal display area to respectively drive a middle sub-area to two-side sub-areas of each horizontal display area by the source driver, and the driving currents corresponding to the middle sub-area to the two-side sub-areas gradually increase.

In some embodiments, the driving method further includes: connecting an adjustable compensation resistor to each input channel in series, wherein the compensation resistance intervals selected for the plurality of horizontal display areas from being close to the source driver to far away from the source driver gradually decreases.

In some embodiments, the driving method further includes: selecting the compensation resistance intervals for each horizontal display area, wherein compensation resistance values of each compensation resistance interval gradually decrease from a middle sub-area to two-side sub-areas of each horizontal display area.

In the display device and the driving method provided by the embodiment of the present application, driving current intervals from small to large is input to a plurality of horizontal display areas from being close to a source driver to far away from the source driver, to realize a driving ability from small to large for the plurality of horizontal display areas. This solves a problem of a gradual decrease in brightness caused by gradually increasing capacitive resistance loads of the plurality of horizontal display areas from close to the source driver to far away from the source driver, so as to reduce the brightness difference between the plurality of horizontal display areas. Therefore, the brightness of each horizontal display area is basically the same, and the display unevenness of the display panel is prevented.

DETAILED DESCRIPTION OF PREFERRED SPECIFIC EMBODIMENTS OF THE INVENTION

In order to make the objective, technical solutions, and effects of the present application clearer, the following further describes this application in detail with reference to the accompanying drawings and examples. It should be noted that the specific embodiments described herein are only used to explain the present application, and are not used to limit the present application.

Figure 1:
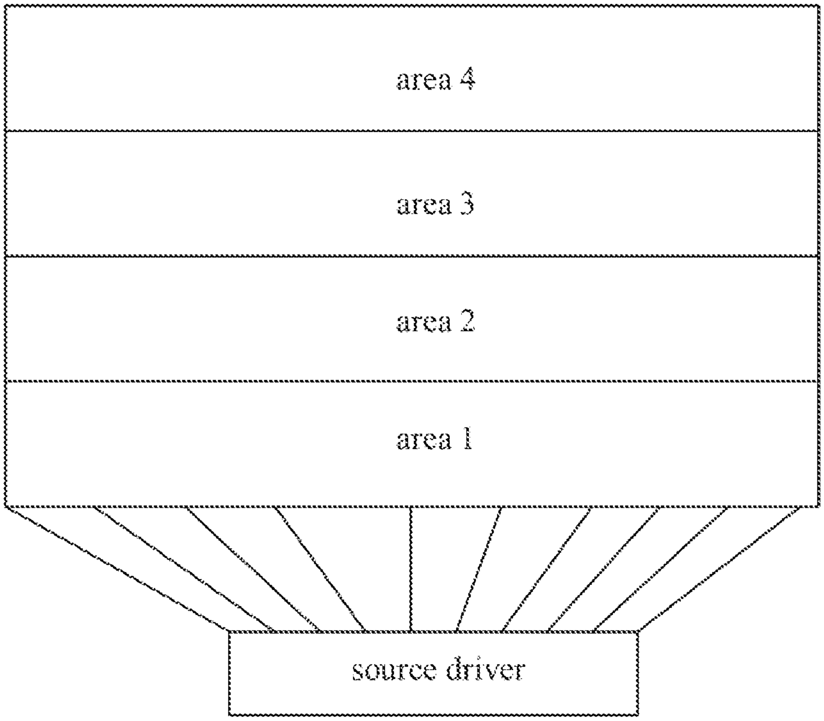
FIG. 1 is a schematic diagram of a structure of a display device in the prior art.

First of all, as the capacitive resistance loads (RC loading) of input channels corresponding to a pixel unit close to a source driver to a pixel unit far away from the source driver becomes larger and larger so that the charging time from the pixel unit close to the source driver to the pixel unit far away from the source driver becomes shorter and shorter. Therefore, the brightness of the pixel units from being close to the source driver to far away from the source driver is getting lower and lower. For example, the display panel has 4 horizontal display areas as shown in FIG. 1. For area 1, area 2, area 3, and area 4, the brightness of area 1 to area 4 will be getting lower and lower, resulting in an uneven display of the display panel in each horizontal display area.

Figure 3:
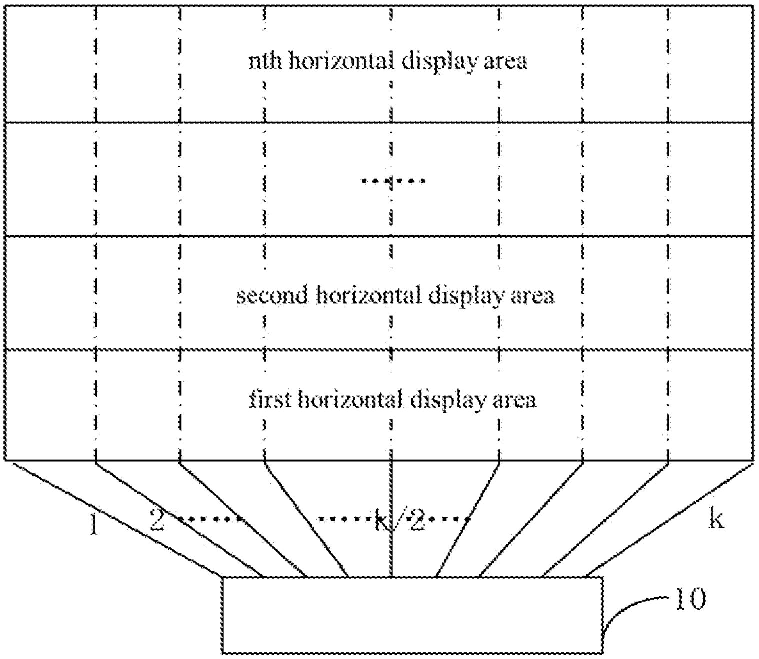
FIG. 3 is a schematic structural diagram of a display device provided by an embodiment of the present application.

In order to solve this problem, an embodiment of the present application provides a display device. FIG. 3 is a schematic structural diagram of the display device provided in an embodiment of the present application. As shown in FIG. 3, the display device includes a display panel and at least one source driver 10 connected to the display panel. The display panel includes a plurality of horizontal display areas from being close to the source driver 10 to far away from the source driver 10. The source driver 10 respectively output different driving current intervals through a plurality of input channels to correspondingly drive the plurality of horizontal display areas from being close to the source driver to far away from the source driver, and the driving current intervals corresponding to the horizontal display areas close to the source driver 10 to the driving current intervals corresponding to the horizontal display areas far from the source driver 10 gradually increase.

For example, the display panel includes first horizontal display area to nth horizontal display area from being close to the source driver 10 to far away from the source driver 10, and the first horizontal display area to nth horizontal display area are respectively driven by the driving current interval I1 to In. That is, a first horizontal display area is driven by a drive current interval I1, a second horizontal display area is driven by a drive current interval I2, and so on. An nth horizontal display area is driven by a driving current interval In, where each current in I1 to In represents a current interval, and $I1<I2<\ldots<In$.

Therefore, the driving current intervals from small to large are input to the first horizontal display area to the nth horizontal display area from being close to a source driver 10 to far away from the source driver 10 to realize a gradually increasing driving capability for the first horizontal display area to the nth horizontal display area. This solves a problem of a gradual decrease in brightness caused by gradually increasing capacitive resistance loads of the first horizontal display area to nth horizontal display area from being close to the source driver to far away from the source driver, so as to reduce the brightness difference between the first horizontal display area and the nth horizontal display area. Therefore, the brightness of the first horizontal display area to the nth horizontal display area is basically the same, and display unevenness of the display panel is prevented.

It should be noted that, in this embodiment and the following embodiments, the display device only includes one source driver 10 is taken as an example. In practical applications, a large-size display panel generally includes at least two source drivers 10 respectively for driving different vertical display areas in the display panel.

Figure 2:
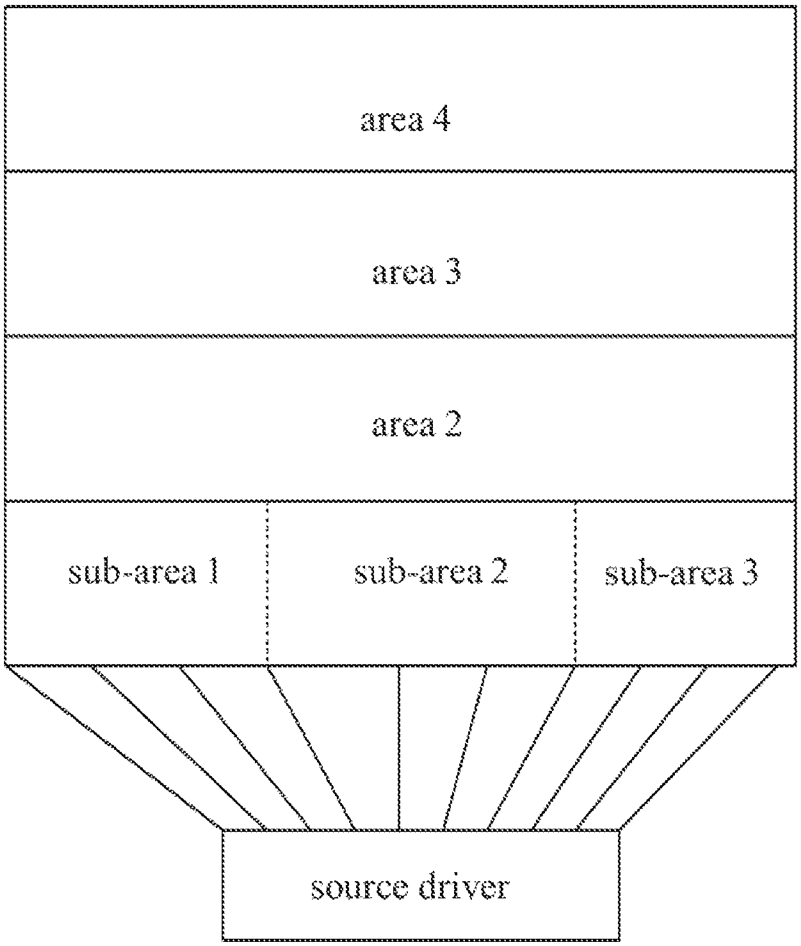
FIG. 2 is a schematic diagram of another structure of a display device in the prior art.

Secondly, in the fan-out wiring of the fan-out area between the source driver 10 and the display panel, the fan-out wiring corresponding to the middle part of the display panel is usually shorter, and the fan-out wiring corresponding to the two sides of the display panel is relatively long so that the capacitive resistance loads of the input channels on both sides of the display panel are larger than the capacitive resistance loads of the input channels in the middle part of the display panel. FIG. 2 is a schematic diagram of another structure of a display device in the prior art. As shown in FIG. 1 and FIG. 2, if each horizontal display area includes 3 vertical display areas, for example, area 1 includes sub-area 1, sub-area 2, and sub-area 3, then in area 1, the brightness of the sub-area 2 is higher than the brightness of the sub-area 1 and the brightness of the sub-area 3. This will cause the display of the display panel in each vertical display area to be uneven.

In order to solve this problem, the source driver 10 is further configured to select and output different driving currents in the driving current interval corresponding to each horizontal display area to drive the middle sub-area to the two-side sub-areas of the horizontal display areas, and the driving currents corresponding to the middle sub-area to the driving currents corresponding to the two-side sub-areas gradually increase.

For example, the display panel includes the first horizontal display area to the nth horizontal display area from being close to the source driver 10 to far away from the source driver 10, and the driving current interval I1 corresponding to the first horizontal display area is (I10, I1*m*), the driving current interval I2 corresponding to the second horizontal display area is (I20, I2*m*), . . . the driving current interval In corresponding to the nth horizontal display area is (In0, Inm), where $I10<I1m<I20<I2m<\ldots<In0<Inm$. As shown in FIG. 3, if there are k channels between the source driver 10 and the display panel, i.e., each of the horizontal display areas is driven by these k channels, then k drive currents I11, I12 . . . . I1*k* in the drive current interval I1 (I10, I1*m*) (i.e., the I11, I12, . . . I1*k* is between I10 and I1*m*) are selected to input to the k input channels corresponding to the first horizontal display area. In the same way, k drive currents I21, I22, . . . I2*k* in the drive current interval I2 (I20, I2*m*) (i.e., the I21, I22 . . . I2*k* is between I20 and I2*m*) are selected to input to the k input channels corresponding to the second horizontal display area, . . . and k drive currents In1, In2, . . . . Ink (i.e., the In1, In2, . . . , Ink is between In0 and Inm) in the drive current interval In (In0, Inm) are selected to input to the k input channels corresponding to the n horizontal display areas.

Figure 4:
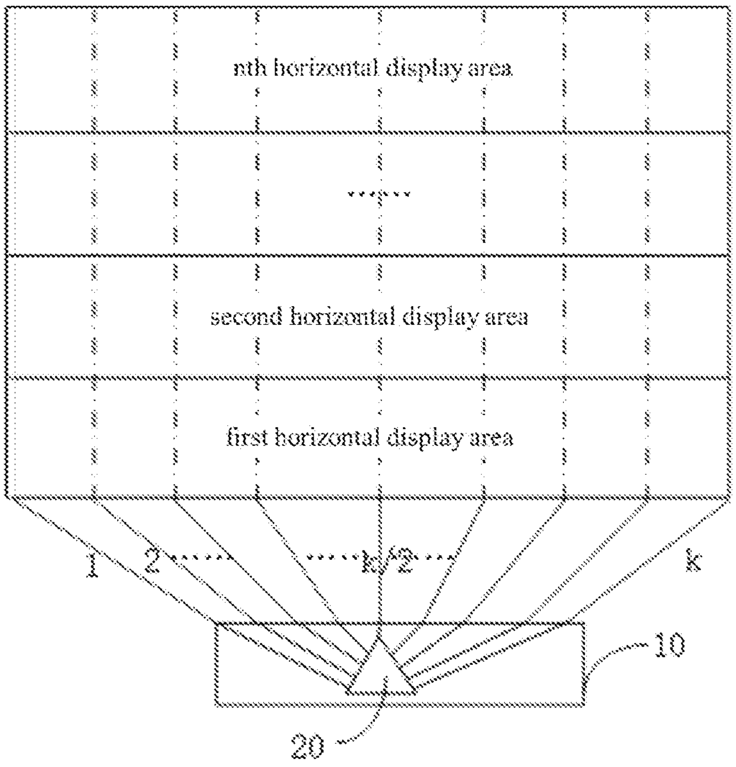
FIG. 4 is a schematic diagram of a first specific structure of a display device provided by an embodiment of the application.

Furthermore, because the fan-out wiring corresponding to the input channels in the middle sub-area of each horizontal display area is shorter than the fan-out wiring corresponding to the channels in the two-side sub-areas, the capacitive resistance loads of the input channels in the middle sub-area is smaller than the capacitive resistance load of the input channels in the two-side sub-areas, so the drive currents corresponding to the middle sub-area to the drive currents corresponding to the two-side sub-areas of each horizontal display area are set to be gradually increasing. In this way, the driving capability of the input channels in the two-side sub-areas is greater than the driving capability of the input channels in the middle sub-area to reduce the brightness difference between the sub-areas in each horizontal display area. Therefore, the brightness of each vertical display area is basically the same. That is, in the first horizontal display area, if I11, I12, . . . , I1*k* are the drive currents corresponding to the first input channel to the kth input channel, respectively, the I11, I12 . . . , I1*k* presents a trend from large to small, and then from small to large. For example, if the driving current of the k/2 input channel in the middle sub-area is I1*k*/2, then $I11>I12\ldots>I1k/2$, and $I1k/2<I1(k/2+1)\ldots<I1k$. Similarly, in the second horizontal display area, $I21>I22\ldots>I2k/2$, and $I2k/2<I2(k/2+1)\ldots<I2k$, up to the nth horizontal display area, $In1>In2\ldots>Ink/2$, and $Ink/2<In(k/2+1)\ldots<Ink$ Based on the foregoing embodiment, FIG. 4 is a schematic diagram of a first specific structure of a display device provided by an embodiment of the application. As shown in FIG. 4, the source driver 10 includes at least one multi-output adjustable current source 20. A plurality of the input channels are respectively connected to the multi-output adjustable current source 20. The multi-output adjustable current source 20 is used to output a corresponding driving current interval to drive a horizontal display area.

For example, the display panel includes the first horizontal display area to the nth horizontal display area from being close to the source driver 10 to far away from the source driver 10, and the multi-output adjustable current source 20 is used to output the driving current of each input channel. When the drive current input to the first horizontal display area is selected, the drive current interval I1 (I10, I1*m*) corresponding to the first horizontal display area is output. In the same way, when the drive current input to the second horizontal display area is selected, the drive current interval I2 (I20, I2*m*) corresponding to the second horizontal display area is output. Until the drive current input to the nth horizontal display area is selected, the drive current interval In (In0, Inm) corresponding to the n horizontal display area is output.

Further, the multi-output adjustable current source 20 is also used to output driving currents of different magnitudes in the driving current interval corresponding to each horizontal display area to drive the middle sub-area to the two-side sub-areas of the horizontal display area.

For example, if there are k input channels between the source driver 10 and the display panel, i.e., each horizontal display area is driven by these k input channels, the multi-output adjustable current source 20 respectively selects I11, I12 . . . , I1*k* as the driving current corresponding to the first input channel to the kth input channel. In the same way, when the drive current input to the second horizontal display area is selected, the drive current interval I2 corresponding to the first horizontal display area is output, and I21, I22 . . . , I2*k* are respectively selected as the drive current corresponding to the first input channel to the kth input channel. Until the drive current input to the nth horizontal display area is selected, the drive current interval In corresponding to the first horizontal display area is output, and In1, Inn, . . . . Ink are respectively selected as the driving current corresponding to the first input channel to the kth input channel.

It should be noted that the multi-output adjustable current source 20 includes multiple current gears, and the multiple-output adjustable current source 20 outputs different driving currents by switching the multiple current gears.

Figure 5:
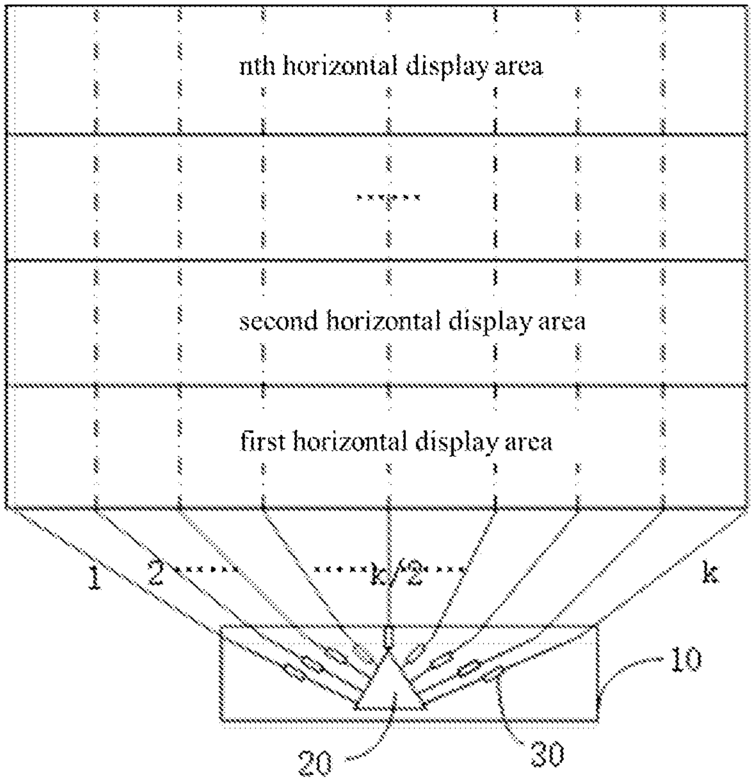
FIG. 5 is a schematic diagram of a second specific structure of a display device provided by an embodiment of the application.

Based on the foregoing embodiment, FIG. 5 is a schematic diagram of a second specific structure of the display device provided by an embodiment of the application. As shown in FIG. 5, each input channel is connected to an adjustable compensation resistor 30 in series, wherein the compensation resistance intervals selected for the horizontal display areas from being close to the source driver 10 to far away from the source driver 10 gradually decreases.

For example, the display panel includes the first horizontal display area to the nth horizontal display area from being close to the source driver 10 to far away from the source driver 10, then the first horizontal display area to the nth horizontal display area are respectively connected in series with the compensation resistance intervals R1-Rn. That is, the first horizontal display area is connected in series with the compensation resistance interval R1, the second horizontal display area is connected in series with the compensation resistance interval R2, and so on. The nth horizontal display area is connected in series with the compensation resistance interval Rn, wherein each resistance in R1 to Rn represents a resistance interval, and R1>R2> . . . >Rn.

Therefore, the input channels corresponding to the first horizontal display area to the nth horizontal display area from being close to the source driver 10 to far away from the source driver 10 is connected in series with the compensation resistances intervals from large to small, to compensate for the increasing trend of the capacitive resistance loads in the first horizontal display area to the nth horizontal display area. This reduces the capacitive resistance load difference between the first horizontal display area and the nth horizontal display area to reduce the brightness difference between the first horizontal display area and the nth horizontal display area so that the brightness of the first horizontal display area to the nth horizontal display area is basically the same, and the display unevenness of the display panel is prevented.

Further, the compensation resistance intervals selected for the plurality of horizontal display areas from being close to the source driver to far away from the source driver gradually decreases.

For example, the compensation resistance interval R1 corresponding to the first horizontal display area is (R10, R1*m*), the compensation resistance interval R2 corresponding to the second horizontal display area is (R20, R2*m*), . . . , and the compensation resistance interval Rn corresponding to the nth horizontal display area is (Rn0, Rnm), where R10>R1*m*<R20>R2*m*> . . . >Rn0>Rnm. If there are k input channels between the source driver 10 and the display panel, i.e., each horizontal display area is driven by these k input channels, then k compensation resistance values R11, R12, . . . R1*k* (i.e., R11, R12, . . . . R1*k* is between R10 and R1*m*) are selected in the compensation resistance interval R1 (R10, R1*m*) and input them to the k input channels corresponding to the first horizontal display area. K compensation resistance values R21, R22, . . . *k* (i.e., R21, R22, . . . R2*k* is between R20 and R2*m*) are selected in the compensation resistance interval R2 (R20, R2*m*) and input them to the k input channels corresponding to the second horizontal display area. K compensation resistance values Rn1, Rn2, . . . . Rnk (i.e., Rn1, Rn2, . . . Rnk is between Rn0 and Rnm) are selected in the compensation resistance interval Rn (Rn0, Rnm) and input them to the k input channels corresponding to the nth horizontal display area.

Furthermore, because the fan-out wiring corresponding to the input channels in the middle sub-area of each horizontal display area is shorter than the fan-out wiring corresponding to the input channels in the two-side sub-areas, the capacitive resistance load of the input channels in the middle sub-area is less than the capacitive resistance load of the input channels in the two-side sub-areas, and the compensation resistance values corresponding to the middle sub-area to the compensation resistance values corresponding to the two-side sub-areas of each horizontal display area gradually decreases. This makes the difference between the capacitive resistance loads of each input channel as small as possible to reduce the brightness difference between the sub-areas in each horizontal display area so that the brightness of each vertical display area is basically the same. That is, in the first horizontal display area, if R11, R12, . . . R1*k* are the compensation resistance values corresponding to the first input channel to the kth input channel, R11, R12, . . . R1*k* presents a changing trend from small to large and then from large to small. For example, if the compensation resistance value of the k/2 input channel in the middle sub-area is R1*k*/2, then R11<R12 . . . <R1*k*/2, and R1*k*/2>R1 (*k*/2+1) . . . >R1*k*. Similarly, in the second horizontal display area, R21<R22, . . . <R2*k*/2, and R2*k*/2>R2(*k*/2+1), . . . >R2*k*, . . . and in the nth horizontal display area, Rn1< Rn2, . . . <Rnk/2, and Rnk/2>Rn(k/2+1) . . . >Rnk.

As mentioned above, in the above embodiments, the brightness of each area of the display panel is basically the same by adjusting the driving current and the compensation resistance in the following two aspects. On the one hand, for the horizontal display areas, the driving currents from the first horizontal display area to the nth horizontal display area from being close to the source driver 10 to far away from the source driver 10 is increased from small to large. Furthermore, the compensation resistance values for the first horizontal display area to the nth horizontal display area are increased from large to small, thereby reducing the difference between the capacitive resistance loads of the first horizontal display area to the nth horizontal display area, and the driving capability of the first horizontal display area to the nth horizontal display area ranges from small to large. On the other hand, for the vertical display area, the driving currents from the middle sub-area to the two-side sub-areas of each horizontal display area are increased from small to large, and the compensation resistance values from the middle sub-area to the two-side sub-areas of each horizontal display area are from large to small. This reduces the difference between the capacitive resistance loads of each sub-area in each horizontal display area. In addition, the driving capacity from the middle sub-area to the two-side sub-areas of each horizontal display area is from small to large, so that the brightness of each area of the display panel is basically the same through the adjustment of the driving current and the compensation resistance in the above two aspects. In addition, it should be noted that in the adjustment process of the drive current and compensation resistance in the above two aspects, the adjustment of the drive current and/or compensation resistance between the horizontal display areas or between the vertical display areas, or between the horizontal display area and the vertical display area is a process of mutual coordination, and the ultimate goal is to make the brightness of each area of the display panel consistent through the common adjustment of the drive current and the compensation resistor.

Figure 6:
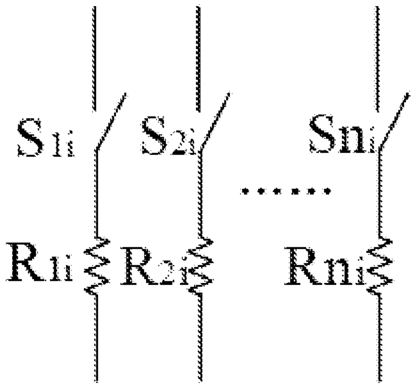
FIG. 6 is a schematic structural diagram of an adjustable compensation resistor in a display device provided by an embodiment of the present application.

It should be noted that the adjustable compensation resistor 30 can be an adjustable resistor, i.e., the value of the compensation resistance of the compensation resistor 30 can be adjusted by adjusting the adjustable resistor. Alternatively, FIG. 6 is a schematic structural diagram of the adjustable compensation resistor 30 in the display device provided by an embodiment of the application. FIG. 6 shows an optional structure of the adjustable compensation resistor 30 in FIG. 5, where the value of i in FIG. 6 is an integer between 1 and k. As shown in FIG. 6, the adjustable compensation resistor 30 includes a plurality of parallel branches, each parallel branch includes a resistor and a switch connected in series, and the resistance of the plurality of parallel branches is different. That is, the magnitude of the compensation resistance value is realized by selecting the resistance in series with the switch by turning off the switch. For example, for the first horizontal display area to the nth horizontal display area close to the source driver to far away from the source driver 10, each adjustable compensation resistor 30 includes n parallel branches, and each parallel branch includes a series resistor and switch. The n resistors of the n parallel branches of the adjustable compensation resistor 30 connected in series in the first input channel are R11, R21, . . . . Rn1, and the series switches of the R11, R21 . . . Rn1 are S11, S21 . . . Sn1, S11, respectively. The n resistors of the n parallel branches of the adjustable compensation resistor 30 connected in series in the second input channel are R12, R22 . . . Rn2, and R12, and the series switches of R12, R22 . . . Rn2 are respectively S12, S22 . . . Sn2, and so on. The n resistors of the n parallel branches of the adjustable compensation resistor 30 connected in series in the kth input channel are respectively R1*k*, R2*k* . . . Rnk, and the switches of R12, R22 . . . . Rn2 in series are S1*k*, S2*k* . . . Snk, respectively. Each input channel selects a parallel branch of the adjustable compensation resistor 30 to compensate the first horizontal display area to the nth horizontal display area. That is, the n resistors of the n parallel branches of the adjustable compensation resistor 30 connected in series in each input channel are respectively used to compensate the first horizontal display area to the nth horizontal display area.

Figure 7:
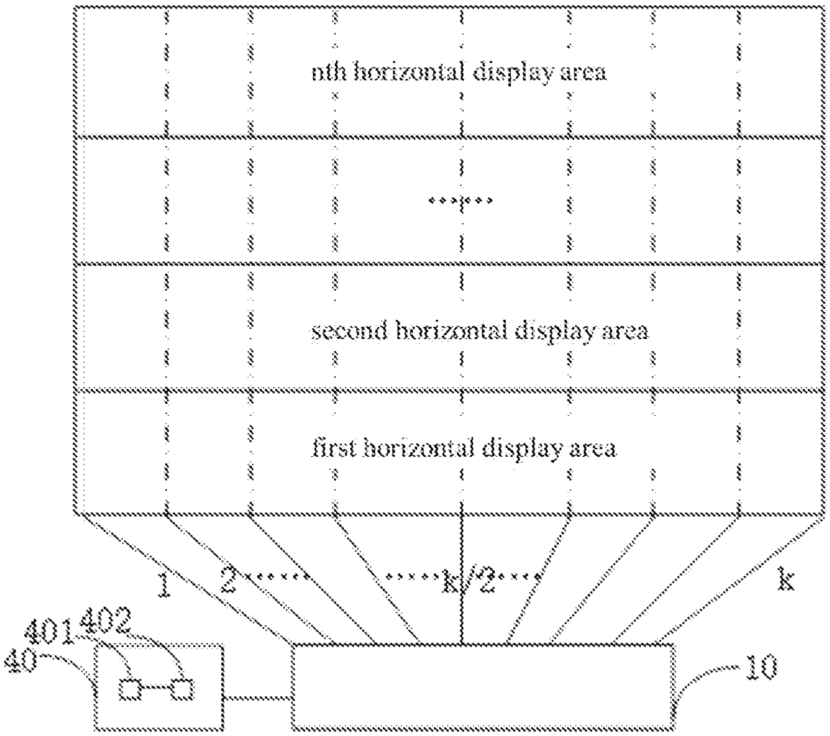
FIG. 7 is a schematic diagram of another structure of a display device provided by an embodiment of the present application.

In addition, FIG. 7 is a schematic diagram of another structure of the display device provided by an embodiment of the application. As shown in FIG. 7, the display device further includes a timing controller 40. The timing controller 40 is connected to the source driver 10 and is used to control the source driver 10 to select the driving current and to select the adjustable compensation resistor 30 for each input channel.

Specifically, the timing controller 40 includes a register 401 and a control module 402. The register 401 is used to register the drive current and the compensation resistance value corresponding to each horizontal display area to be selected for each input channel. For example, when the first input channel drives the nth horizontal display areas, the timing controller 40 selects In1 as the driving current and selects Rn1 as the compensation resistance value.

In a second aspect, an embodiment of the present application provides a driving method of a display device. The display device includes a display panel and at least one source driver 10 connected to the display panel. The display panel includes a plurality of horizontal display areas from being close to the source driver 10 to far away from the source driver 10. The driving method includes: The source driver 10 respectively outputs different driving current intervals through a plurality of input channels to correspondingly drive the horizontal display areas from being close to the source driver 10 to the horizontal display areas far away from the source driver 10, wherein the driving current intervals corresponding to the plurality of horizontal display areas from being close to the source driver 10 to far away from the source driver 10 gradually increase.

In the driving method of the display device provided by the embodiment of the present application, driving current intervals from small to large are input to a plurality of horizontal display areas from being close to the source driver 10 to far away from the source driver 10 to realize a driving ability from small to large for the plurality of horizontal display areas. This solves a problem of gradual decrease in brightness caused by gradually increasing capacitive resistance loads of the plurality of horizontal display areas from being close to the source driver 10 to far away from the source driver 10, so as to reduce brightness difference between the plurality of horizontal display areas. Therefore, the brightness of each horizontal display area is basically the same, and a display panel is prevented from displaying unevenness.

Further, the driving method further includes: the source driver 10 is further configured to select and output different driving currents in each driving current interval corresponding to each horizontal display area to respectively drive a middle sub-area to two-side sub-areas of each horizontal display area, wherein the driving currents corresponding to the middle sub-area to the two-side sub-areas gradually increase.

In the driving method of the display device provided by the embodiment of the present application, the driving current gradually increasing in the driving current interval corresponding to the horizontal display area is further selectively input to the middle sub-area to the two side sub-areas, to reduce the brightness difference in each horizontal display area. Therefore, the brightness of each vertical display area is basically the same, and the display panel is prevented from displaying unevenness.

Based on the above embodiment, the driving method further includes: connecting an adjustable compensation resistor 30 in series in each input channel, wherein compensation resistance intervals selected for the plurality of horizontal display areas from being close to the source driver 10 to far away from the source driver 10 gradually decreases.

In the driving method of the display device provided by the embodiment of the present application, further compensating the compensation resistance values from small to large for the plurality of horizontal display areas close to the source driver 10 to far away from the source driver 10. Therefore, the difference between the capacitive resistance loads of each horizontal display area is reduced to reduce the brightness difference between each horizontal display area, so that the brightness of each horizontal display area is basically the same, and the display panel is prevented from displaying unevenness.

Further, the driving method further includes: the compensation resistance values of the compensation resistance interval selected for each horizontal display area gradually decreases from the middle sub-area to the two side sub-areas of the horizontal display area.

In the driving method of the display device provided by the embodiment of the present application, the driving current gradually increasing in the driving current interval corresponding to the horizontal display area is further selectively input to the middle sub-area to the two side sub-areas, to reduce the brightness difference in each horizontal display area. Therefore, the brightness of each vertical display area is basically the same, and the display panel is prevented from displaying unevenness.

It can be understood that for those of ordinary skill in the art, equivalent substitutions or changes can be made according to the technical solution and inventive concept of the present application, and all these changes or substitutions should fall within the protection scope of the claims of the present application.

What is claimed is:

1. A display device, comprising a display panel and a source driver connected to the display panel, wherein the display panel comprises a plurality of horizontal display areas from being close to the source driver to far away from the source driver;

- wherein the source driver is configured to respectively output different driving current intervals through a plurality of input channels to correspondingly drive the plurality of horizontal display areas from being close to the source driver to far away from the source driver,
- wherein the driving current intervals corresponding to the plurality of horizontal display areas from being close to the source driver to far away from the source driver gradually increase,
- wherein the source driver comprises at least one multi-output adjustable current source, the plurality of input channels are respectively connected with the multi-output adjustable current source, and the multi-output adjustable current source is configured to output a corresponding driving current interval to drive one of the plurality of horizontal display areas, and
- each of the plurality of horizontal display areas is divided into a left sub-area, a middle sub-area, and a right sub-area, and the adjustable current source is further configured to output currents that increase in magnitude bidirectionally starting from the middle sub-area and expanding out to both the left sub-area and the right sub-area and are from respective driving current interval corresponding to the each horizontal display area.

2. The display device of claim 1, wherein the sub-areas of the each horizontal display area are driven by currents that increase in magnitude bidirectionally starting from the middle sub-area and expanding out to both the left sub-area and the right sub-area and are from respective driving current interval corresponding to the each horizontal display area.

3. The display device of claim 1, wherein each input channel is connected to an adjustable compensation resistor in series, and wherein compensation resistance intervals selected for the plurality of horizontal display areas from being close to the source driver to far away from the source driver gradually decrease.

4. The display device of claim 3, wherein compensation resistance values of respective compensation resistance interval selected for the each horizontal display decrease in magnitude bidirectionally starting from the middle sub-area and expanding out to both the left sub-area and the right sub-area.

5. The display device of claim 3, wherein the adjustable compensation resistor is an adjustable resistor.

6. The display device of claim 3, wherein the adjustable compensation resistor comprises a plurality of parallel branches, each of the plurality of parallel branches comprises a resistor and a switch connected in series, and magnitudes of resistance of the plurality of parallel branches are different.

7. The display device of claim 3, further comprising a timing controller connected to the source driver, wherein the timing controller is configured to control the source driver to select driving currents and the adjustable compensation resistor for each of the plurality of input channels.

8. A display device, comprising a display panel and a source driver connected to the display panel, wherein the display panel comprises a plurality of horizontal display areas from being close to the source driver to far away from the source driver; wherein the source driver is configured to respectively output different driving current intervals through a plurality of input channels to correspondingly drive the plurality of horizontal display areas from being close to the source driver to far away from the source driver, and

- wherein the driving current intervals corresponding to the plurality of horizontal display areas from being close to the source driver to far away from the source driver gradually increase; and
- wherein each of the plurality of horizontal display areas is divided into a left sub-area, a middle sub-area, and a right sub-area, and the sub-areas of the each horizontal display area are driven by currents that increase in magnitude bidirectionally starting from the middle sub-area and expanding out to both the left sub-area and the right sub-area and are from respective driving current interval corresponding to the each horizontal display area.

9. The display device of claim 8, wherein the source driver comprises at least one multi-output adjustable current source, the plurality of input channels are respectively connected with the multi-output adjustable current source, and the multi-output adjustable current source is configured to output a corresponding driving current interval to drive one of the plurality of horizontal display areas.

10. The display device of claim 9, wherein the multi-output adjustable current source is further configured to output driving currents of different magnitudes in the driving current interval corresponding to each horizontal display area, to drive the middle sub-area to the two-side sub-area of each horizontal display area.

11. The display device of claim 8, wherein each input channel is connected to an adjustable compensation resistor in series, and wherein compensation resistance intervals selected for the plurality of horizontal display areas from being close to the source driver to far away from the source driver gradually decreases.

12. The display device of claim 11, wherein compensation resistance values of each compensation resistance interval selected for each horizontal display area from a middle sub-area to two-side sub-areas of each horizontal display area gradually decreases.

13. The display device of claim 11, wherein the adjustable compensation resistor is an adjustable resistor.

14. The display device of claim 11, wherein the adjustable compensation resistor comprises a plurality of parallel branches, each of the plurality of parallel branches comprises a resistor and a switch connected in series, and magnitudes of resistance of the plurality of parallel branches are different.

15. A driving method of a display device, wherein the display device comprises a display panel and at least one source driver connected to the display panel, the display panel comprises a plurality of horizontal display areas from being close to the source driver to far away from the source driver; and the driving method comprises:

respectively outputting different driving current intervals through a plurality of input channels by the source driver to correspondingly drive the plurality of horizontal display areas from being close to the source driver to far away from the source driver, wherein the driving current intervals corresponding to the plurality of horizontal display areas from being close to the source driver to far away from the source driver gradually increase, wherein each of the plurality of horizontal display areas is divided into a left sub-area, a middle sub-area, and a right sub-area, and the sub-areas of the each horizontal display area are driven by currents that increase in magnitude bidirectionally starting from the middle sub-area and expanding out to both the left sub-area and the right sub-area and are from respective driving current interval corresponding to the each horizontal display area.

16. The driving method of the display device of claim 15, further comprising:

connecting an adjustable compensation resistor to each input channel in series, wherein compensation resistance intervals selected for the plurality of horizontal display areas from being close to the source driver to far away from the source driver gradually decreases.

17. The driving method of the display device of claim 16, further comprising:

compensation resistance values of respective compensation resistance interval selected for the each horizontal display decrease in magnitude bidirectionally starting from the middle sub-area and expanding out to both the left sub-area and the right sub-area.

* * * * *